United States Patent [19]
Roy et al.

[11] Patent Number: 5,677,540
[45] Date of Patent: Oct. 14, 1997

[54] OPTICAL NOTCH DETECTOR HEAD FOR PHOTOGRAPHIC FILM

[75] Inventors: Carl Wilson Roy, Spencerport; John Adams Schempp, Jr., Fairport; Lester John Sadowski, Rochester, all of N.Y.

[73] Assignee: Eastman Kodak Company, Rochester, N.Y.

[21] Appl. No.: 610,019

[22] Filed: Mar. 4, 1996

[51] Int. Cl.⁶ .................................................. G01N 21/86
[52] U.S. Cl. .................. 250/559.02; 250/559.4; 355/41
[58] Field of Search ................. 250/559.02, 566, 250/559.29, 559.4, 559.42, 559.44; 355/41, 50, 28–29, 75, 77; 209/565, 598, 600, 933; 235/462, 472

[56] References Cited

U.S. PATENT DOCUMENTS

| | | | |
|---|---|---|---|
| 1,752,966 | 4/1930 | Rusden | 226/17 |
| 1,753,033 | 4/1930 | Taveira | 226/17 |
| 2,281,627 | 5/1942 | Smith | 226/18 |
| 3,139,963 | 7/1964 | Nadler et al. | 226/19 |
| 3,752,377 | 8/1973 | Knapp | 226/17 |
| 4,049,486 | 9/1977 | Henley | 226/17 |
| 4,240,741 | 12/1980 | Anderson et al. | 355/40 |
| 4,324,488 | 4/1982 | Anderson et al. | 355/74 |
| 4,736,228 | 4/1988 | Ito | 355/75 |
| 4,761,675 | 8/1988 | Sawasaki | 355/76 |
| 4,909,425 | 3/1990 | Susini et al. | 226/17 |
| 4,994,850 | 2/1991 | Imamura et al. | 355/75 |
| 5,055,874 | 10/1991 | Kralles et al. | 355/76 |
| 5,134,430 | 7/1992 | Koizumi | 396/615 |
| 5,167,751 | 12/1992 | Shimizu et al. | 226/19 |
| 5,190,233 | 3/1993 | Nelson et al. | 242/56 |
| 5,258,807 | 11/1993 | Reinke | 355/76 |
| 5,260,740 | 11/1993 | Seto | 355/41 |
| 5,271,542 | 12/1993 | Yamamoto | 226/179 |
| 5,285,325 | 2/1994 | Kiesow | 360/3 |
| 5,406,352 | 4/1995 | Kralles et al. | 355/75 |
| 5,475,465 | 12/1995 | Narukami et al. | 396/615 |
| 5,523,820 | 6/1996 | Mooney et al. | 355/76 |
| 5,535,062 | 7/1996 | Blackman | 360/3 |

FOREIGN PATENT DOCUMENTS

| | | | |
|---|---|---|---|
| 0884192 | 8/1943 | France | 226/19 |
| 3729982 | 3/1989 | Germany | 226/19 |

*Primary Examiner*—Que Le
*Attorney, Agent, or Firm*—Charles E. Snee, III

[57] ABSTRACT

An apparatus for detecting an edge opening (22, 24) in a web (12) of photographic film includes a frame (84, 138, 140); an edge guide (156, 158) supported by the frame, the edge guide having a surface (160) for engaging an edge surface of a web moving past the edge guide; an aperture (334) in the surface; a guide track (325, 327) supported by the frame; an optical sensor (328) mounted on the guide track, the sensor comprising a probe (330) extended through the aperture to a point near the surface; and a mechanism (318–322) for moving the sensor along the guide track to position the probe for accurate detection of an edge opening.

4 Claims, 14 Drawing Sheets

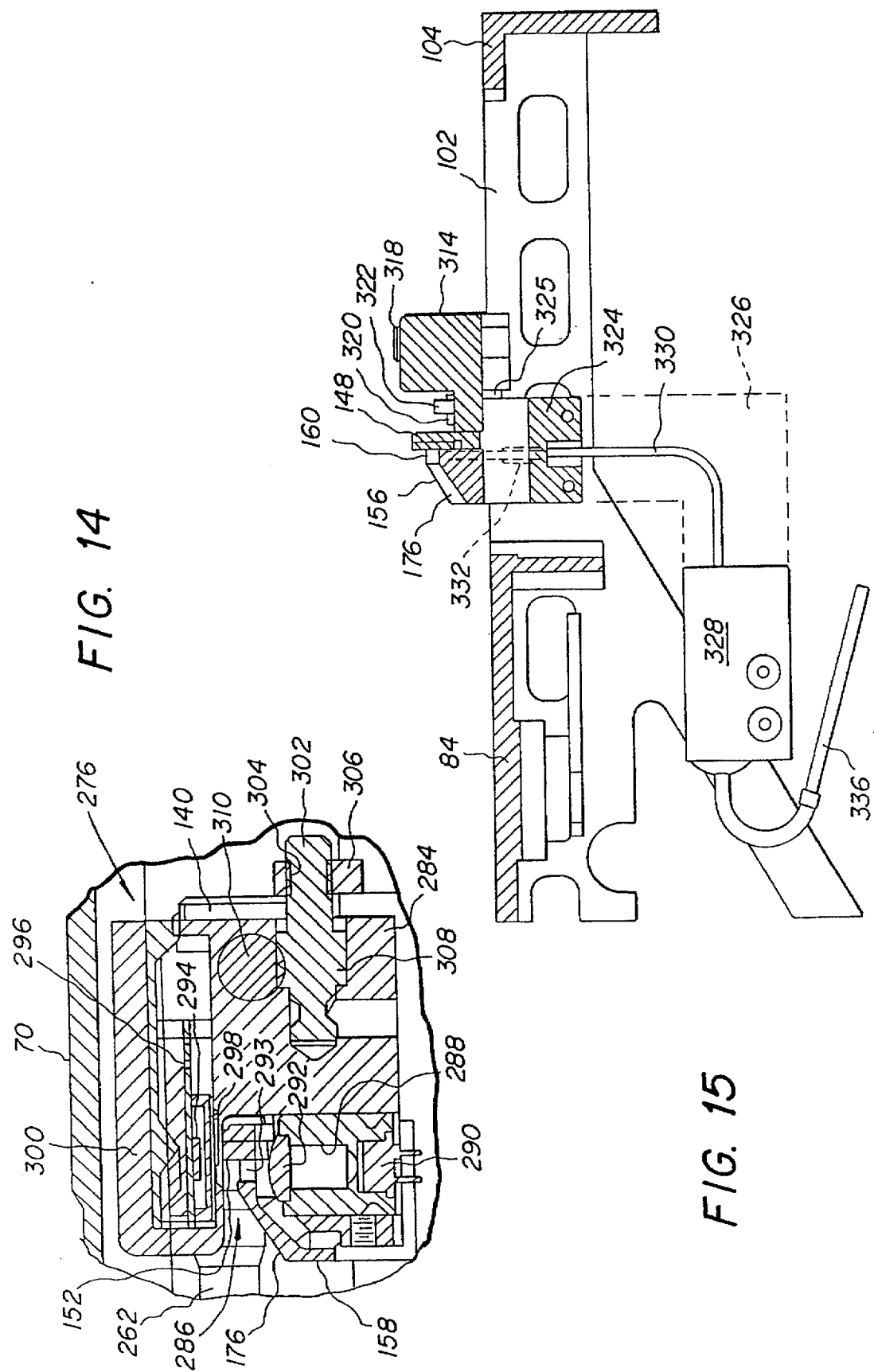

OPTICAL NOTCH DETECTOR HEAD FOR PHOTOGRAPHIC FILM

TECHNICAL FIELD

The invention is related in general to optical notch detectors for photographic film. More particularly, the invention concerns such detectors which include features for precisely adjusting their lateral position relative to an edge of a moving web.

BACKGROUND OF THE INVENTION

In high volume photographic printers, features are known for flattening a processed film strip to facilitate printing. For example, commonly assigned U.S. Pat. No. 5,055,874 discloses a film flattening apparatus of the type shown in FIG. 1 of this description. Such known apparatus 10 is particularly suitable for use in photofinishing apparatus in which the film enters and leaves along paths disposed in essentially the same plane as an exposure aperture. One such photofinishing apparatus is a high speed printer currently available from Eastman Kodak Company under the designation KODAK CLAS 35 II Color Printer.

Apparatus 10 is useful with processed or developed photographic film 12 comprising a thin web 14 with edges 16, 18; frames 20; perforations 22; and spaced edge notches 24. The notches are detected to indicate the position of the web relative to an exposure aperture, in the familiar manner, and may be on either side of the web depending on the type of processor used. Apparatus 10 includes a base 26 having an essentially flat surface 28 for contacting film 12 as it moves through the apparatus. An exposure aperture may be provided through surface 28. Adjoining flat surface 28 are a pair of cylindrical portions 30, 32 having curved film contacting surfaces 34, 36. The curvature of surfaces 34, 36 is chosen so that a film wrapped onto the surfaces will acquire sufficient lateral column strength to facilitate flattening against surface 28 as the film moves past Film code readers have been positioned adjacent similar curved surfaces.

Opposite surfaces 34, 36 are positioned a pair of film deflector members 38, 40 having curved surfaces 42, 44 for engaging the edge portions of the film. Each of the deflector members is in the form of an elongated bar. To prevent scratching of the image portions of frames 20, members 38, 40 include reliefs 46, 48. Spaced upstream and downstream from surfaces 34, 36, outboard of deflector members 38, 40 along the path of movement of the film, am a further pair of cylindrical elements 50, 52 which bound valleys into which deflector members 38, 40 can move. Thus, when the deflector members are moved into the illustrated position, the film is deflected along a serpentine path extending over element 50, under deflector member 38, over surface 34, over surface 28, over surface 36, under deflector member 40, and over element 52. Due to the lateral column strength imparted by wrapping the film around the several curved surfaces as described in U.S. Pat. No. 5,055,874, the film flattens well against surface 28 to facilitate printing.

Although the apparatus shown in FIG. 1 has achieved a considerable measure of success, some problems have been encountered. Photographic film is sold in a considerable variety of formats which may differ in properties such as film thickness, stiffness and width. The apparatus of FIG. 1 is configured to handle films having a fixed width, meaning that several such apparatus must be available to enable a photofinisher to process films of various widths. Thus, a need has existed for such an apparatus such can readily adjust to accommodate films of various transverse widths.

The apparatus of FIG. 1 also is configured to accommodate only rather small variations in film thickness and stiffness, which influence considerably the degree of wrap onto surfaces 34, 36 and the depth of engagement of deflector members 38, 40, necessary to ensure good flatness of the film against surface 28. Thus a further need has existed for such an apparatus which can readily be adjusted to accommodate films of various widths.

Commonly assigned U.S. Pat. No. 5,317,139 discloses an optical code reader for photographic film which can read bar codes present on the edges of the film just outside the perforations. A need has existed for a reader head embodying such a reader and including features for accurately adjusting the position of the reader head relative to the edge of a passing strip of film.

U.S. Pat. No. 5,055,874 also discloses a type of notch detector which can be adjusted in lateral position to align with notches 24. However, the range of adjustment is suited only for films having a fixed width. Thus, a need has existed for such an apparatus which can readily adjust to accommodate films of various transverse widths.

SUMMARY OF THE INVENTION

The primary objective of the invention is to provide an improved apparatus for reading optical cede on a moving strip of photographic film, the apparatus being adjustable for films having different combinations of width, thickness and stiffness.

Another objective of the invention is to provide such an apparatus having an optical code reader such is adjustable to align precisely with an optical code on an edge of the film.

A further objective of the invention is to provide such an apparatus having an edge notch detector which is similarly adjustable.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of the invention is particularly suited for detecting an edge notch, perforation or similar opening near an edge of a web of photographic film. As such, the apparatus may include a first frame; an edge guide supported by the first frame, the edge guide comprising a surface for engaging an edge of the web moving past the edge guide; an aperture in the surface; a guide track supported by the first frame and extended transverse to the edge guide; an optical sensor guided by the guide track, the sensor comprising a probe extended through the aperture to a point near the surface to detect an opening in the film; and means for moving the sensor along the guide track to position the probe for accurate detection.

The means for moving may include a housing supported by the first frame; a shaft mounted for rotation in the housing, the shaft having an end in threaded engagement with the sensor;, a pinion fixedly mounted on the shaft; and a worm gear mounted for rotation in the housing and engaged with the pinion, whereby rotation of the worm gear causes the pinion to rotate the shaft and the end to move the sensor along the guide track. The apparatus may also include a second frame; a substantially straight track supported by the second frame; a carriage member mounted for movement along the track, the fast frame being supported by the carriage member;, the edge guide being supported by the carriage member, the edge guide being positioned transversely to the track; means for moving the carriage member back and forth along the track; and a flexure resiliently engaging the means for moving with the carriage member. The means for moving may include a lead screw rotatably supported by the frame; a traveling nut on the lead screw; the flexure resiliently engaging the nut with the carriage member when the guide is moved toward the web; and means for rotating the lead screw.

The invention provides certain advantages. Each notch detector can be accurately adjusted to ensure its alignment with fixed reference in an associated edge guide, thereby greatly simplifying set up of the apparatus and ensuring reliable detection of notches. Adjustments can be made while the film is moving.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 14 shows an enlarged sectional view of the film code reader head shown in FIG. 7.

FIG. 15 shows a sectional view of the notch detector along line 15—15 of FIG. 4.

DESCRIPTION OF THE PREFERRED EMBODIMENTS

Figure 1:
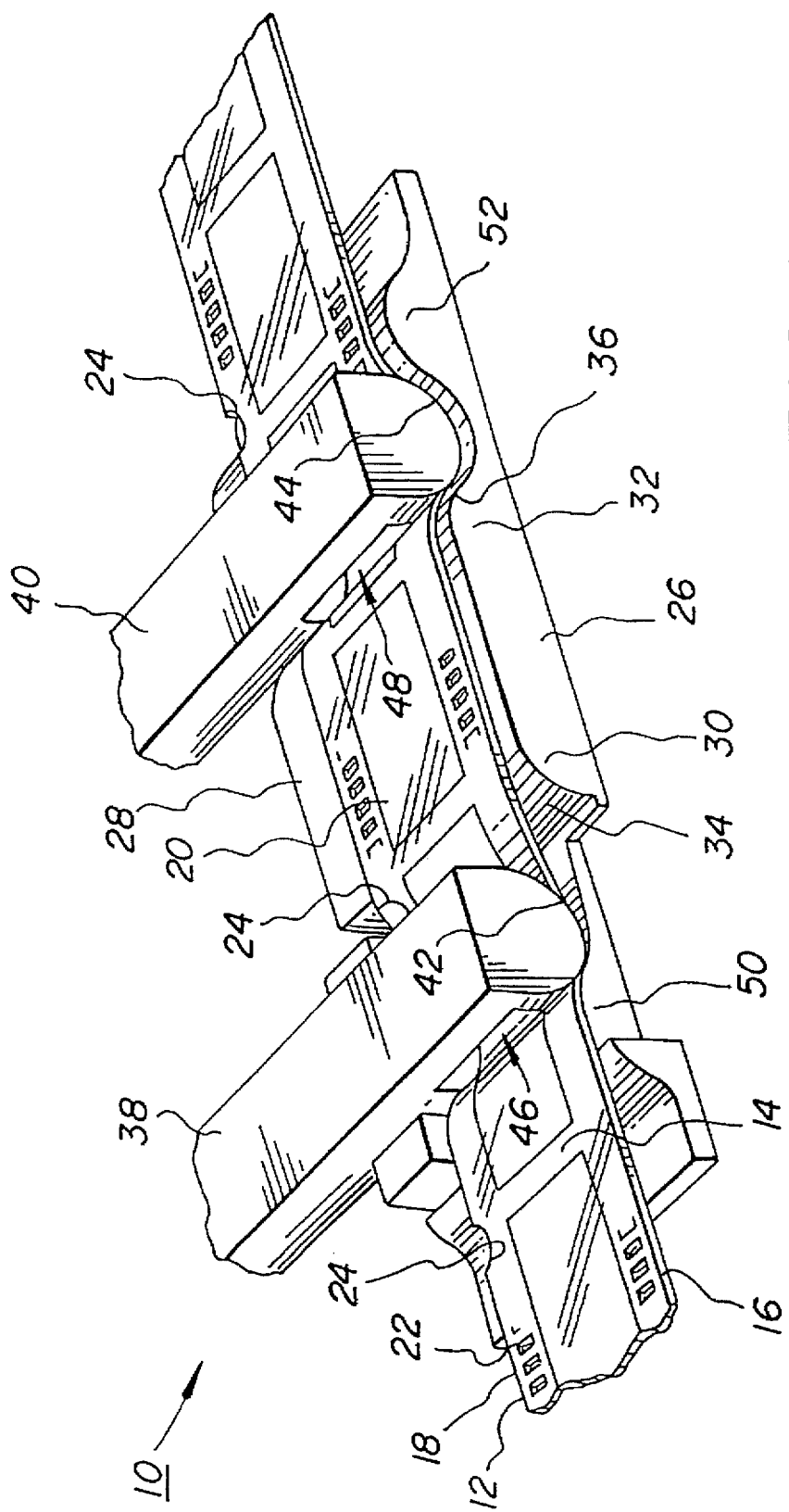
FIG. 1 shows a perspective view of a prior art apparatus for flattening photographic film.
Figure 2:
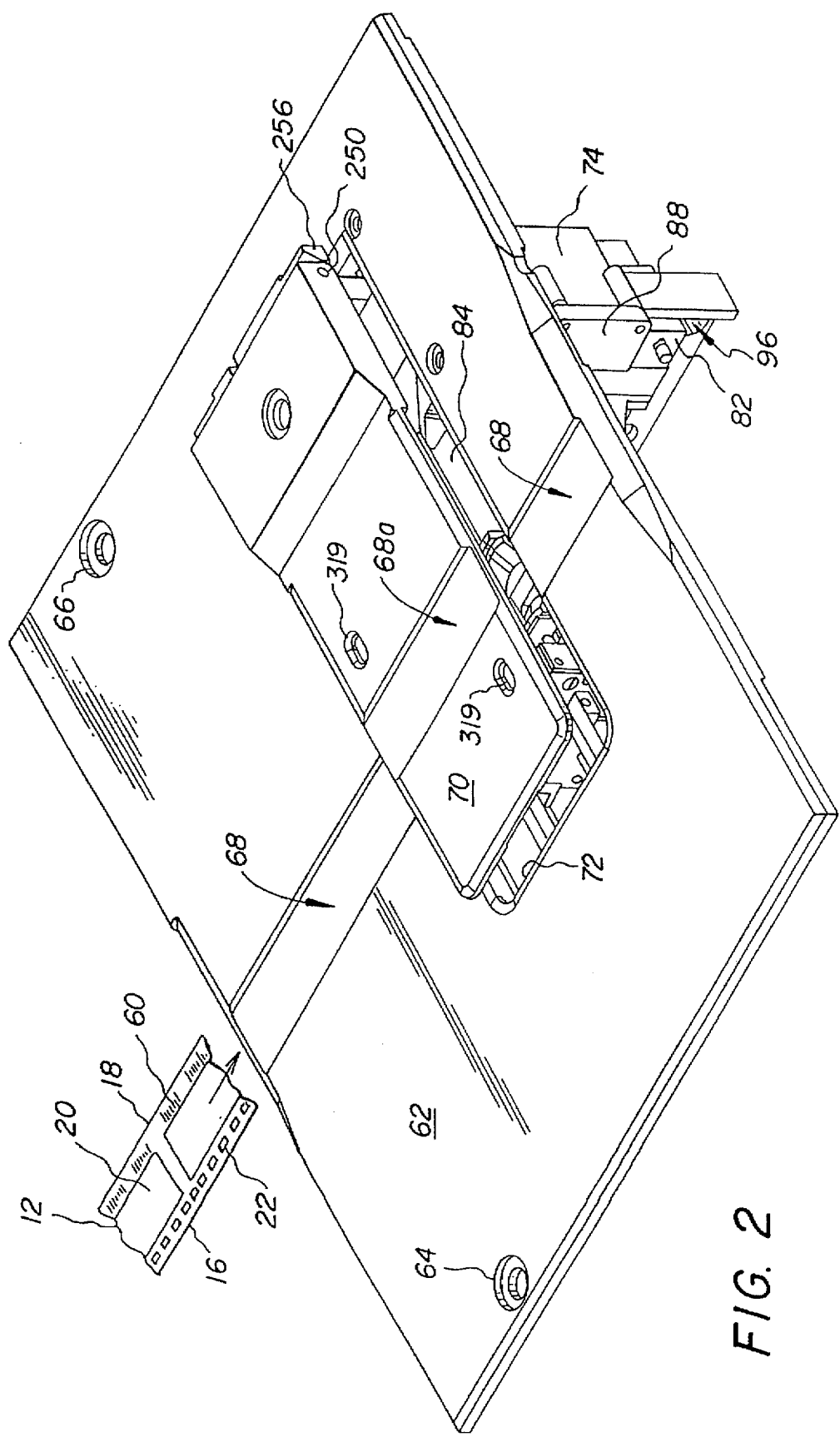
FIG. 2 shows a perspective view of an apparatus for reading optical codes on photographic film, in accordance with the invention.
Figure 3:
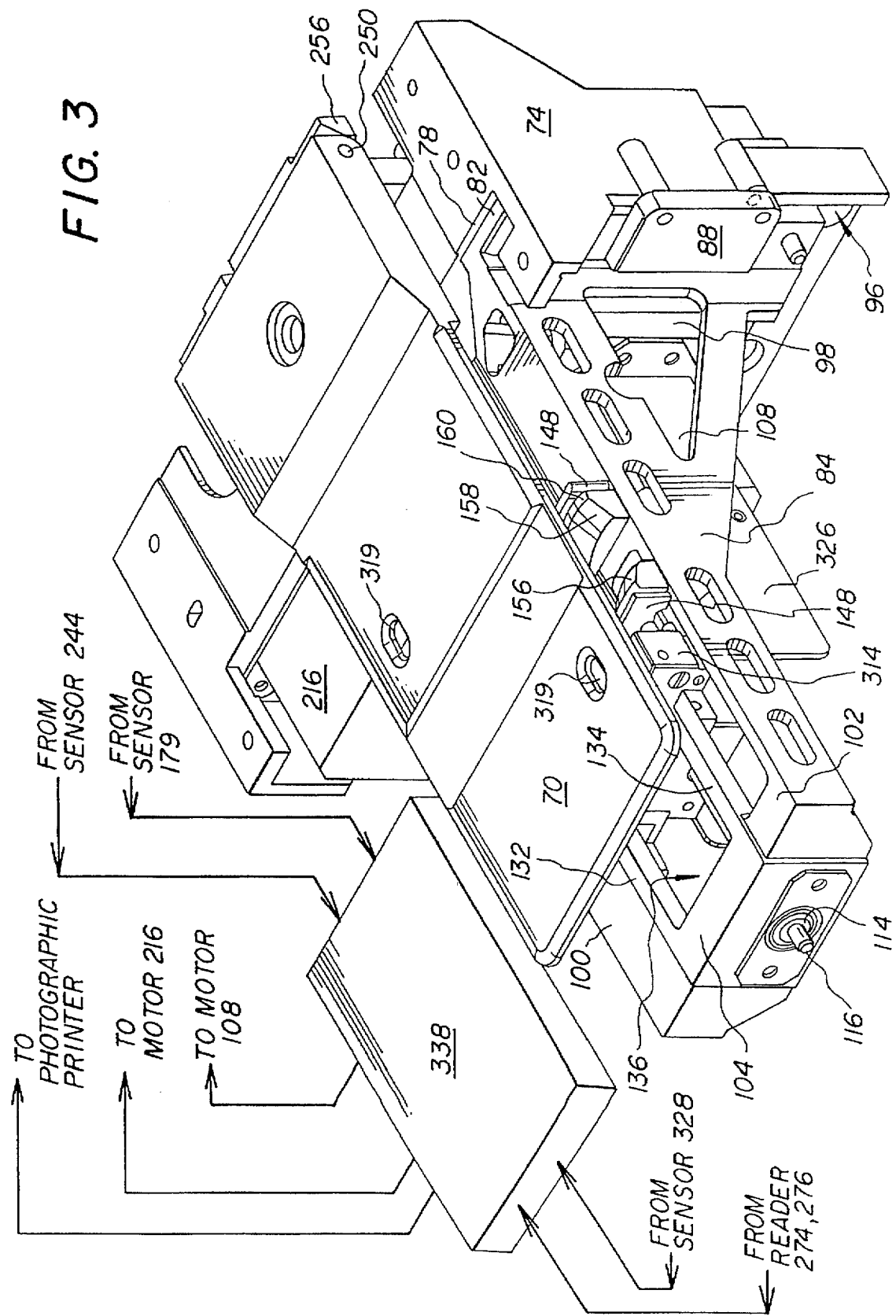
FIG. 3 shows the apparatus of FIG. 2 with the mechanism support plate removed and a controller shown schematically.

The following is a detailed description of the preferred embodiments of the invention, reference being made to the drawings in which the same reference numerals identify the same elements of structure in each of the several Figures.

Referring to FIGS. 2 to 9, various features of the apparatus of the invention can be understood. Film strip 12 includes a film code 60 along one or both edges, such as a bar code identifying the product type and frame number, as described in U.S. Pat. No. 5,317,139. Such a film strip is fed across a support or deck plate 62 having apertures 64, 66 for mounting the plate to an associated apparatus, such as a photograpic printer. A shallow image relief slot 68 is provided across the deck plate to avoid scratching images in frames 20. A film deflector support plate 70 is positioned just above an opening 72 through the deck plate. For some applications, support plate 70 may be lowered to close opening 72 and bypass the film code reader of the invention. So, an image relief slot 68a is provided across the support plate, to align with slot 68. A frame 74 is mounted to an under side of deck plate 62.

Figure 4:
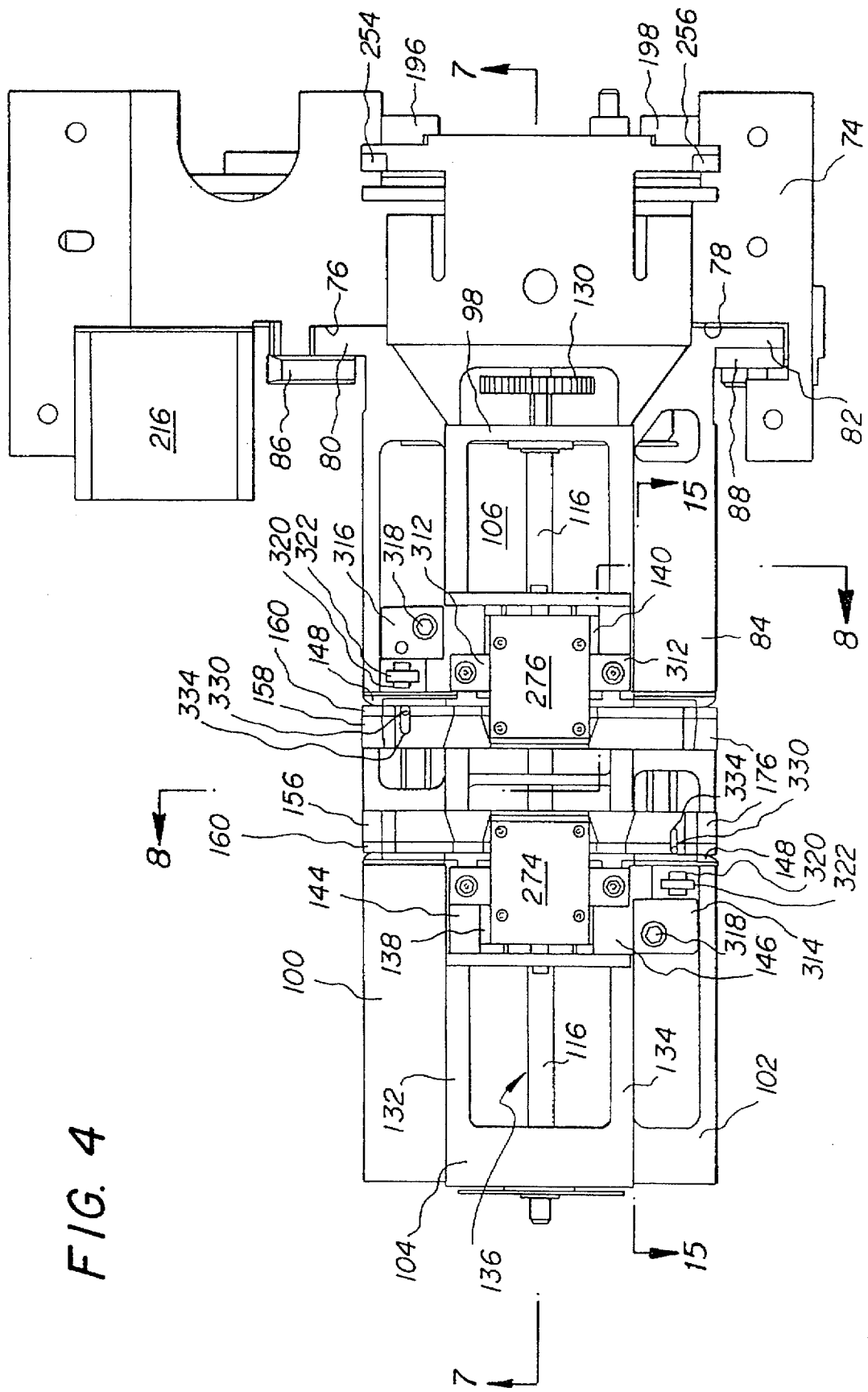
FIG. 4 shows a top plan view of the apparatus of FIG. 3 with the deflection roller support plate removed.
Figure 5:
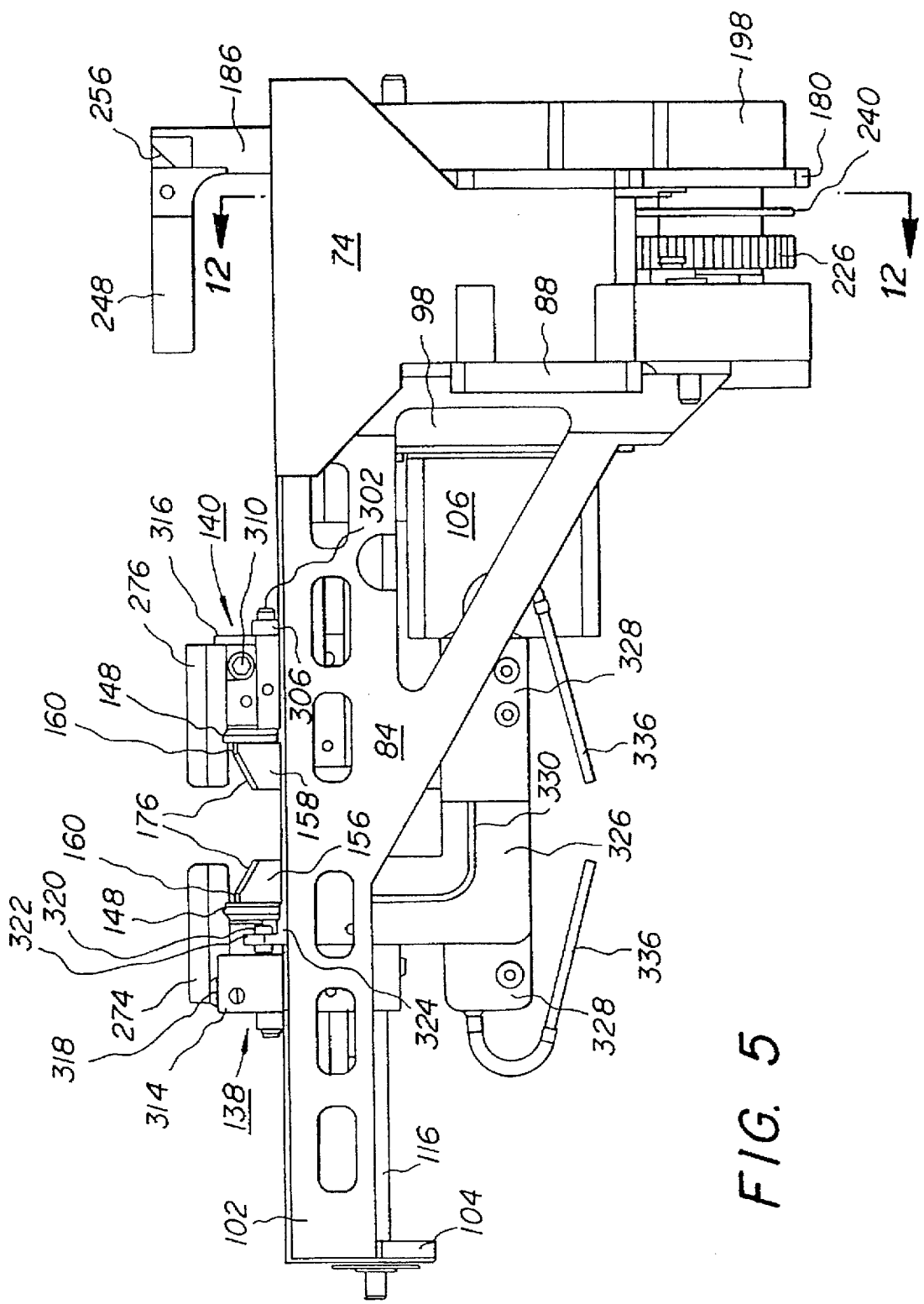
FIG. 5 shows a side elevation view of the apparatus of FIG. 4.
Figure 6:
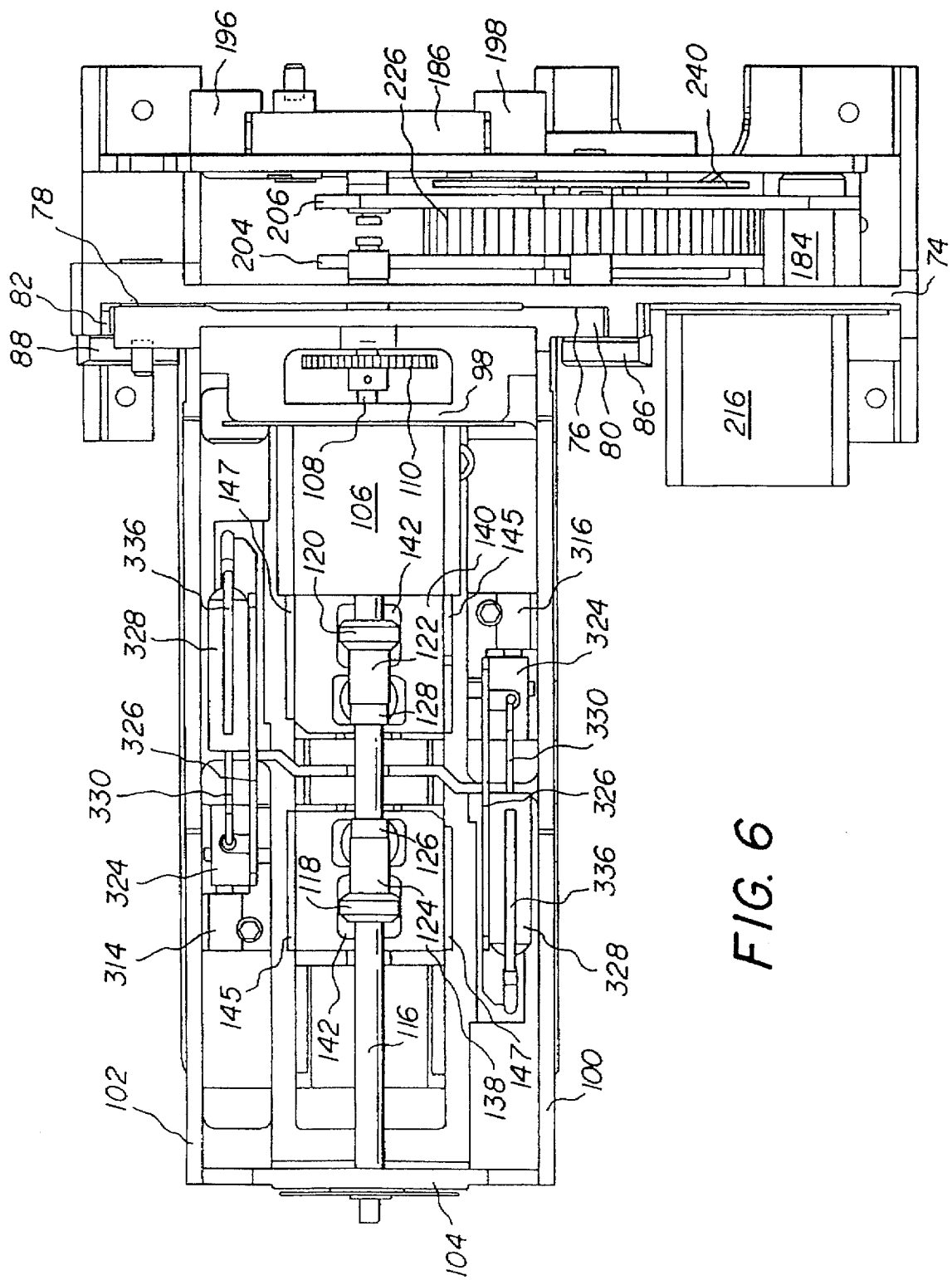
FIG. 6 shows a bottom plan view of the apparatus of FIG. 5.
Figure 9:
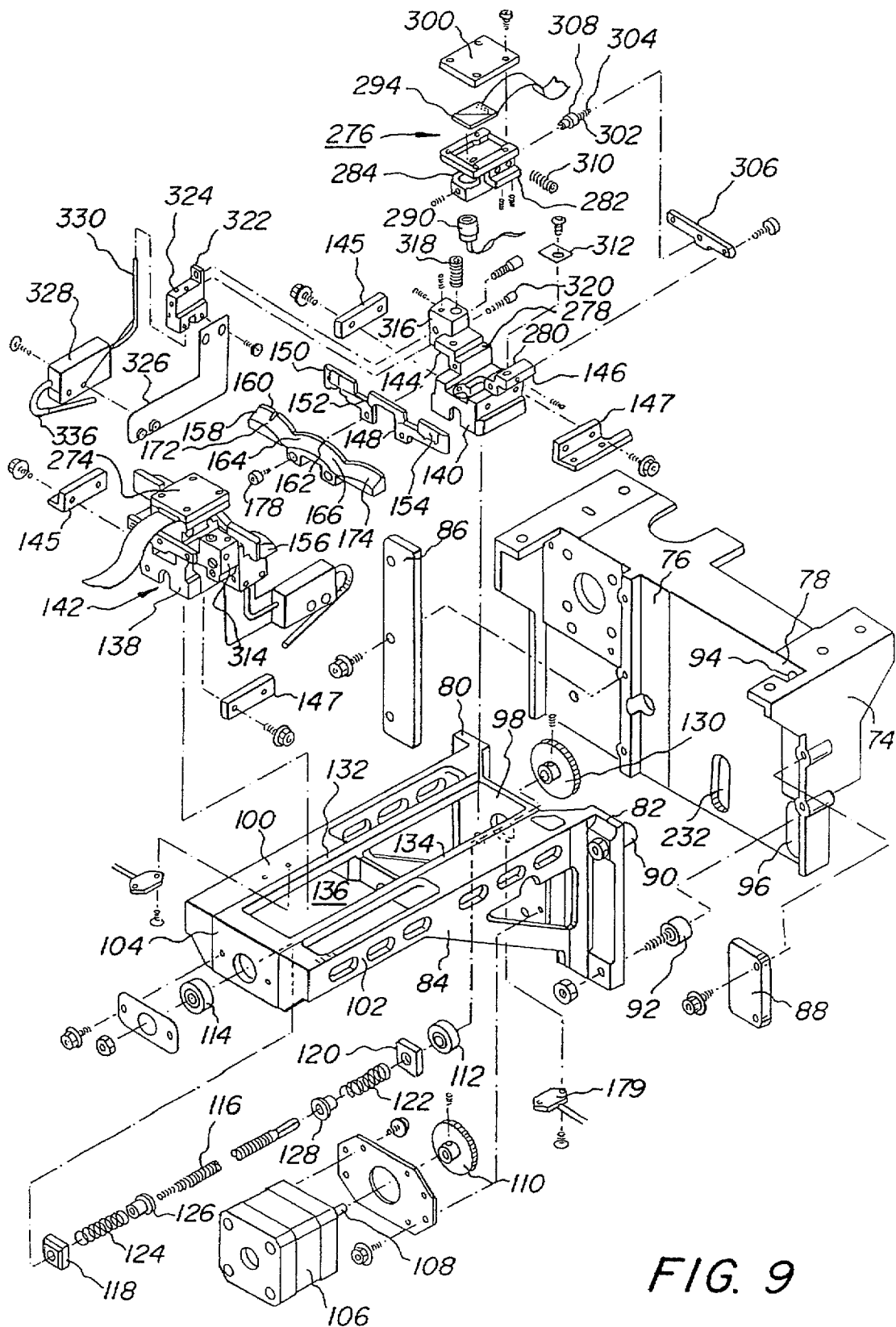
FIG. 9 shows an exploded view of the horizontal positioning mechanism for the edge guides, the film code reader heads and the notch detector heads.

As seen best in FIGS. 4, 6 and 9, frame 74 includes a pair of vertically extended slide surfaces 76, 78 which engage a pair of flanges 80, 82 on a cantilevered carriage frame 84. A pair of keeper plates 86, 88 hold the flanges against the slide surfaces. A pair of guide rollers 90, 92 are mounted to flange 82 and extend into a pair of vertically extended slots 94, 96 formed through slide surface 78. Thus, carriage frame 84 can move vertically relative to frame 74. A mechanism for moving the carriage frame will be described subsequently.

Figure 7:
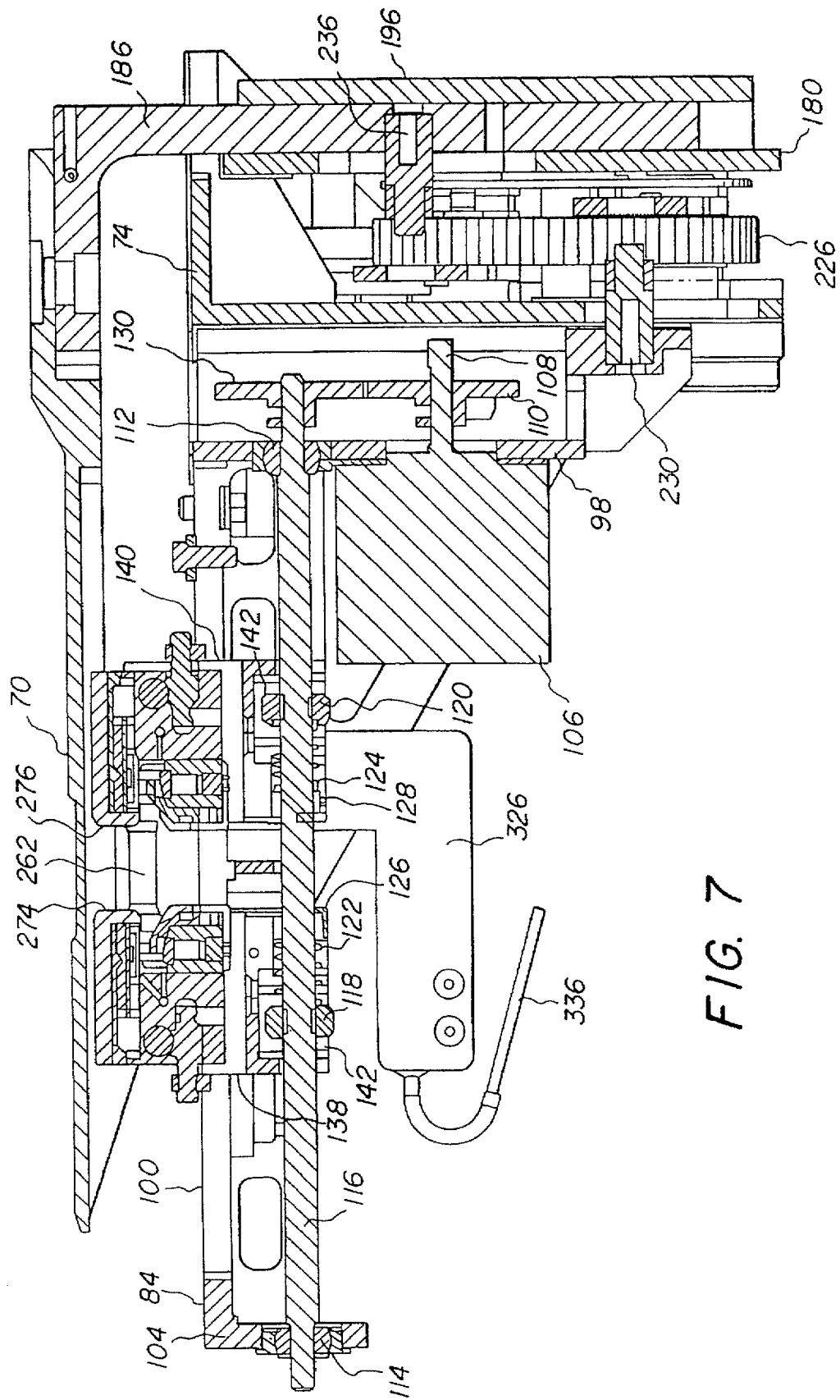
FIG. 7 shows a sectional view along line 7—7 of FIG. 4.

Frame 84 includes an essentially vertical back wall 98 from which extend a pair of parallel cantilever arms 100, 102 whose outer ends are joined by a front wall 104. A motor 106 is mounted to back wall 98, with an output shaft 108 of the motor extended through the back wall. A driver gear 110 is mounted for rotation with shaft 108. As best seen in FIGS. 6, 7 and 9, a pair of bearings 112, 114 are supported by walls 98, 104, respectively, and rotatably support a lead screw 116. As viewed in FIGS. 6 and 7, lead screw 116 includes on one half a right hand threaded potion and on the other half a left hand threaded portion. Those skilled in the art will appreciate that a pair of oppositely threaded, coaxial lead screws also could be used rather than a single, integral lead screw. Mounted on one threaded potion is a traveling nut 118; and on the other threaded potion, a traveling nut 120. Thus, when the lead screw is rotated, the two traveling nuts will move toward or away from each other. A pair of flexures such as coil springs 122, 124 are mounted around the lead screw between the traveling nuts, along with sliding collars 126, 128. A driven gear 130 is mounted to an end of the lead screw near back wall 98, in position to mesh with driver gear 110. Thus, rotation of motor 106 will drive the traveling nuts back and forth on the lead screw.

Cantilever arms 100, 102 are provided on their upper surfaces with a pair of parallel guide tracks 132, 134 separated by an open center slot 136. Within slot 136, a pair of carriage members 138, 140 are mounted, each carriage member having on its under side a pocket or holder 142 for one of nuts 118, 120, one of springs 122, 124 and one of collars 126, 128. As best seen in FIG. 9, each carriage block includes a pair of laterally extended flanges 144, 146 whose under surfaces engage tracks 132, 134, respectively. Below the tracks, a pair of keeper plates 145, 147 are attached to the sides of the carriage members to limit vertical movement, as seen in FIGS. 6 and 9. Thus, movement of traveling nuts 118, 120 causes the carriage members to slide toward or away from each other on tracks 132, 134.

Figure 8:
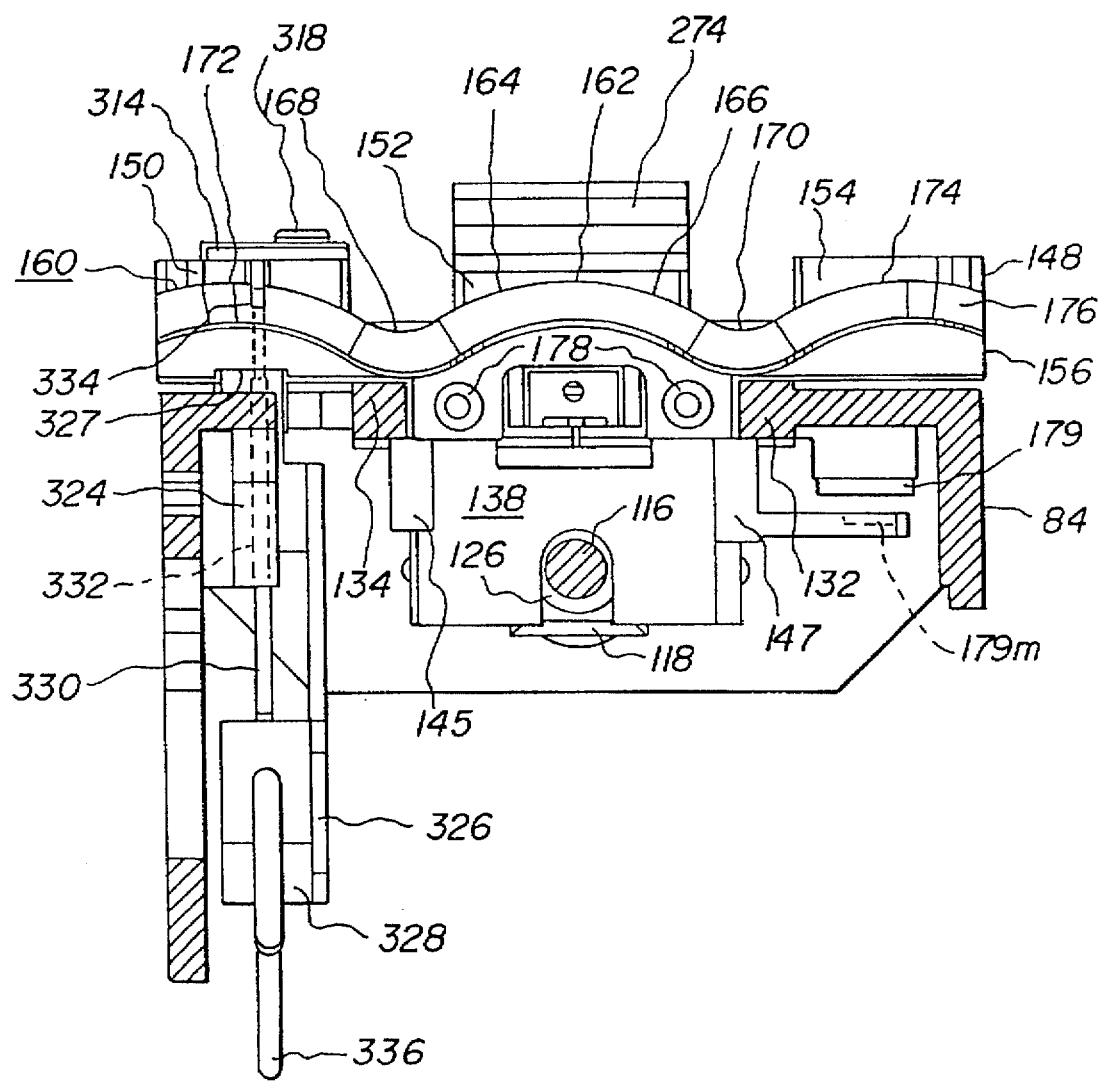
FIG. 8 shows a sectional view along line 8—8 of FIG. 4, with edge guide 158 and associated parts omitted.

Attached to the front vertical surface of each carriage block is a vertical edge guide member 148 having spaced vertical wall segments 150, 152, 154 for engaging the very edges of a film strip. A pair of identical horizontal edge guide members 156, 158 are mounted with one in front of each vertical edge guide member. As best seen in FIGS. 8 and 9, each guide member 156, 158 includes an undulating, horizontal contact surface 160 having a general serpentine configuration much like that described in U.S. Pat. No.

5,055,874. Contact surface 160 engages an under surface of a film strip immediately adjacent one of edges 16, 18. As shown in FIG. 8, contact surface 160 includes a centrally positioned curved portion 162 flanked by further, downwardly curved portions 164, 166, all shaped to provide lateral strength to a film strip wrapped onto them, in the manner previously described. Although central portion 162 preferably is curved, it alternatively may be essentially flat without departing from the scope of the invention. Adjacent to curved portions 164, 166 are a pair of valley portions 168, 170 into each of which a film deflecting roller is lowered, in a manner to be described subsequently. Outboard of the valley portions, a pair of upwardly curved portions 172, 174 are provided. An undulating, upwardly sloped wall portion 176 is provided to guide a film strip upward to engagement with contact surface 160 and wall segments 150, 152, 154. A pair of fasteners 178 seem guide members 148 and guide members 156, 158 to their respective carriage members.

In operation of the adjustable edge guides thus far described, a film strip is threaded between guides 156, 158, which initially are separated by a distance greater than the transverse width of the film. Motor 106 is then operated to rotate lead screw 116 and cause traveling nuts 118, 120 to move toward each other. As the nuts move, they tend to compress springs 122, 124 which press on collars 126, 128 to transmit force to carriage members 138, 140. Movement of the carriage members proceeds until a position is reached corresponding to a separation between guide members 148 approximately equal to the transverse width of the film. As the edge guides move into engagement with the film, the film rides up sloping surface 176 onto undulating support surface 160, where the edges of the film contact vertical guide members 148. The corresponding position of the carriage members is detected by one or more sensors 179, visible in FIGS. 8 and 9, mounted on an under surface of cantilever arm 100 or 102 or both. Sensor 179 may be a conventional proximity type of sensor which responds to presence of magnets 179m carried by a transverse flange on keepers 145, 147. Sensor 179 can detect a plurality of spaced positions of the carriage member corresponding to different widths of film. Separate sensors for each film width may be used, plus a further sensor for a reference position when the edge guides are separated to a maximum extent. A signal from sensor 179 is sent to the controller for the apparatus, to be described subsequently, which stops motor 106 after a predetermined amount of additional rotation. The additional rotation compresses springs 122, 124 to provide a precise, resilient load against edges 16, 18. As a result, the apparatus can handle films of different widths and, due to the resilient loading of the edge guides against the film, is insensitive to variations in the width of the film. The edge guides will not over-constrain the film path since they will track with the film rather than track the film.

Figure 10:
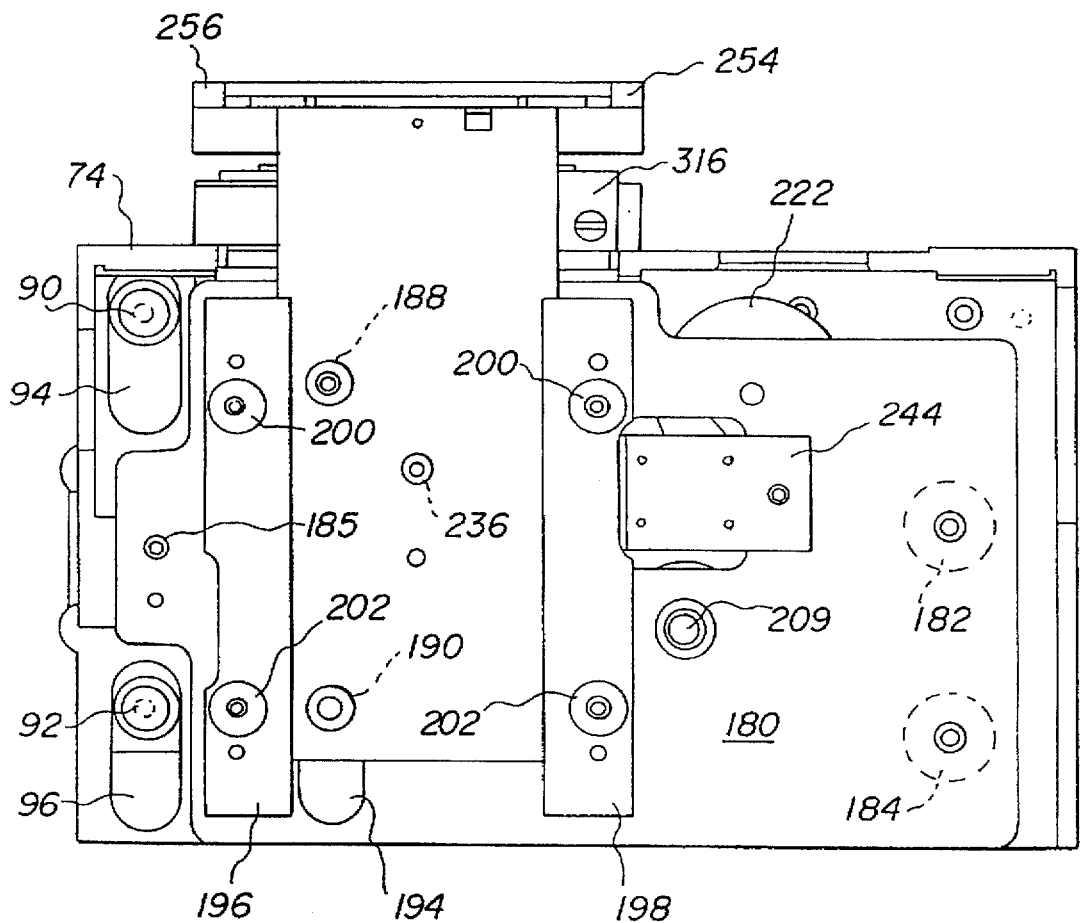
FIG. 10 shows a back elevation view as seen from the fight of FIG. 4.
Figure 11:
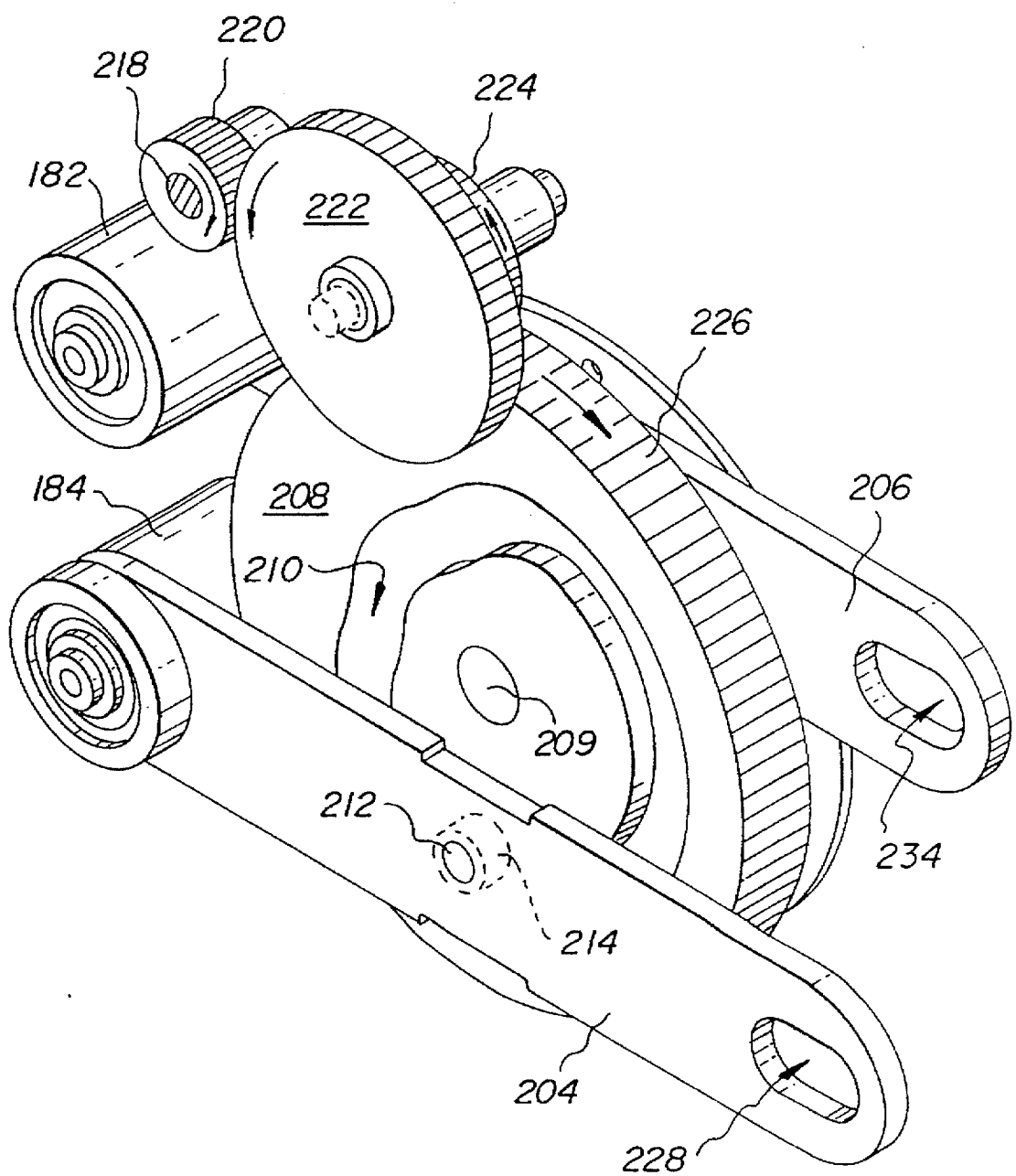
FIG. 11 shows a front perspective view of major components of the vertical positioning mechanism for the edge guides and deflection rollers.
Figure 12:
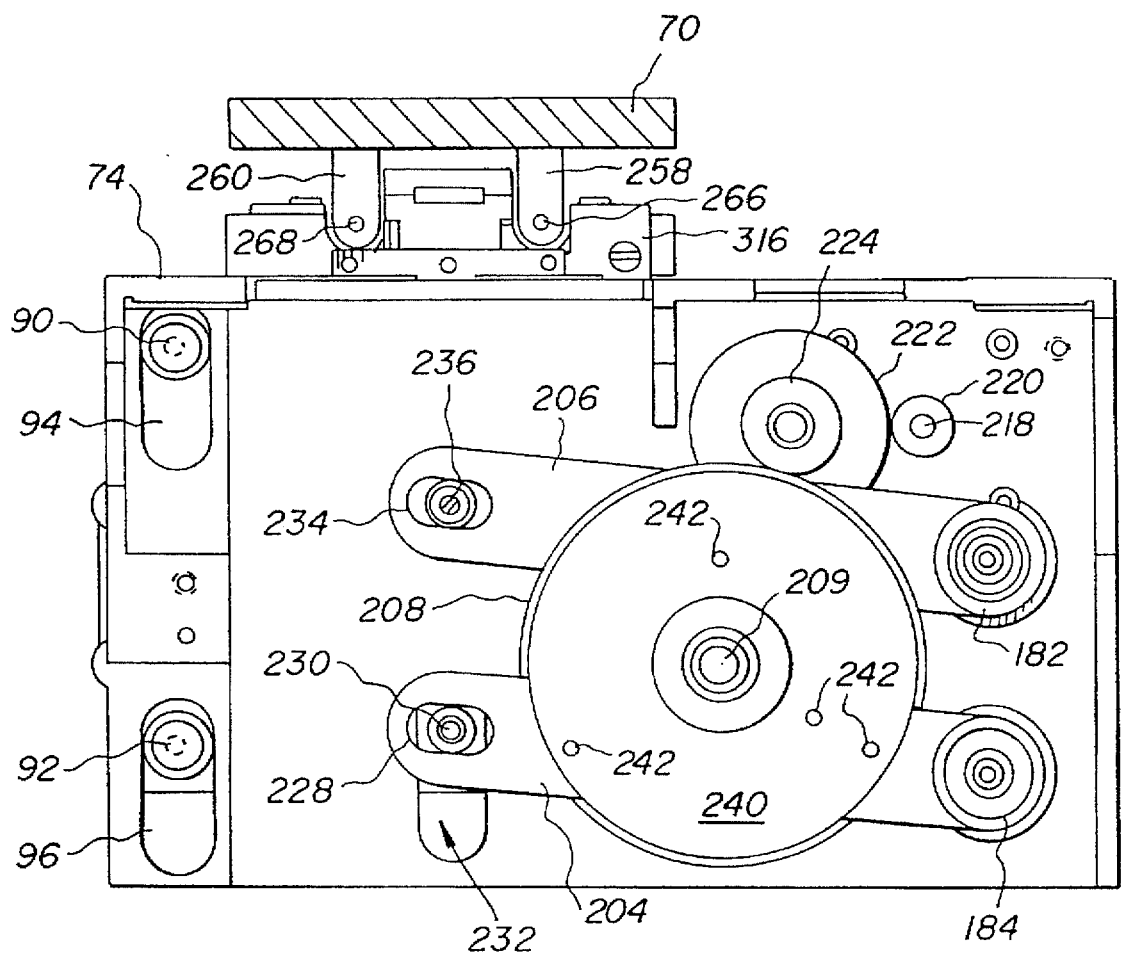
FIG. 12 shows a sectional view along line 12—12 of FIG. 5.
Figure 13:
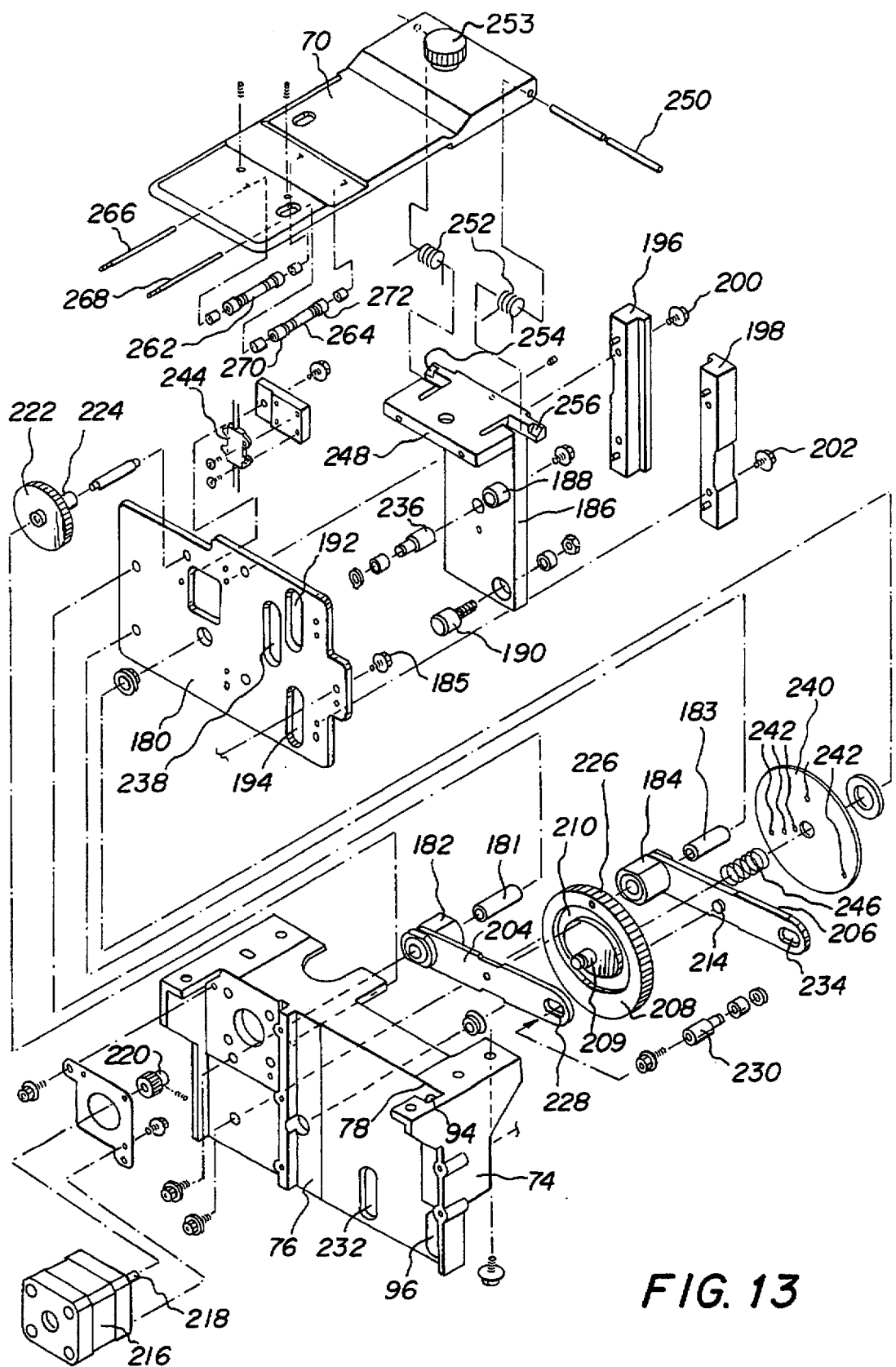
FIG. 13 shows an exploded view of the vertical positioning mechanism for the edge guides and deflection rollers.

Turning now to FIGS. 10 to 13, additional features of the apparatus of the invention can be understood. A slide support plate 180, seen in FIGS. 10 and 13, is mounted in spaced relationship to the back of frame 74 by means of a pair of shafts 181, 183 which support a pair of pivot blocks 182, 184; and by a fastener 185. On the back surface of support plate 180, a vertical slide 186 is mounted in position to pivotably mount support plate 70. A pair of guide rollers 188, 190 are mounted to the front of slide 186 in position to engage slots 192, 194 through support plate 180. A pair of guide tracks 196, 198 secure the slide for vertical movement and are attached to support plate 180 by fasteners 200, 202. Thus, slide 186 is free to move vertically between limits set by slots 192, 194.

Between support plate 180 and the back of frame 74 is mounted a mechanism for vertically moving carriage frame 84 and slide 186. As seen best in FIGS. 10 to 13, this mechanism comprises a pair of cam follower or elevator levee 204, 206 mounted to pivot blocks 182, 184. Between the elevator levers, a dual cam plate 208 is mounted for rotation on an axle 209 cantilevered from frame 74. Cam plate 208 includes in each of its opposite faces a cam slot 210, the slots on the opposite sides being about 180° out of phase. Approximately midway along each elevator lever, an axle 212 supports a cam follower 214, shown in phantom in FIG. 11, which engages one of slots 210. To rotate cam plate 208, a motor 216 is mounted to the front side of frame 74, the motor having an output shaft 218 which extends through a bore in the frame. A driver pinion gear 220 is mounted on shaft 218 and engages a larger gear 222 forcedly mounted on a common shaft with a smaller gear 224 which engages a gear 226 on the periphery of the cam plate. Thus, when motor 216 is energized, the cam plate will rotate and cause the elevator links to pivot in opposite directions.

As best seen in FIG. 13, a slot 228 at the free end of elevator link 204 is engaged with a rotary connector 230 which extends through a slot 232 in frame 74 and connects to carriage frame 84. Similarly, a slot 234 in elevator link 206 is engaged with a rotary connector 236, shown in the upper part of FIG. 13, which extends through a slot 238 in support plate 180 and connects to slide 186. Thus, movement of elevator links 204, 206 in the manner previously described will cause carriage frame 84 and an assembly of slide 186 and support plate 70 to move toward or away from each other. Movement of the carriage frame and slide is monitored by means of a disk 240 resiliently mounted on shaft 209. A plurality of magnetic inserts 242 on the disk influence a magnetic sensor 244 mounted to support plate 180. Sensor 244 then provides a signal to the controller for the apparatus, to indicate the relative vertical positions of the carriage frame and slide, for a purpose to be described subsequently. A spring 246 separates disk 240 from the cam plate.

At the top of slide 186 is provided a horizontally extended mounting bracket 248. An axle 250 and a pair of springs 252 resiliently pivot film reflector support plate 70 to bracket 248. A captured screw, not illustrated but operable by an external knob 253, may be used to hold support plate 70 against bracket 248 in the horizontal position shown in FIGS. 2 and 3. When the screw is turned out of engagement with bracket 248, support plate 70 can pivot upward to provide access to the interior of the apparatus for cleaning or adjustments, its motion being limited by a pair of stops 254, 256. As seen best in FIGS. 12 and 13, support plate 70 includes on its under side two pairs of downwardly extended bosses 258, 260 which rotatably support a pair of film deflector rollers 262, 264 on axles 266, 268. Each roller includes a pair of raised edges 270, 272 for contacting the opposite edges of the film, outside frames 20 to prevent damage to the photographic images.

In operation of the apparatus described thus far with reference to FIGS. 10 to 13, motor 216 is energized to move carriage frame 84 upward and support plate 70 downward. Deflector milers 262, 274 engage the film. The edge guides then are moved into position in the manner previously described. As a result of these movements, the film is deflected into a serpentine path along surface 160 to provide lateral column strength in the manner previously described and to constrain the film against central curved potion 162. The depth of movement of rollers 262, 264 into valley portions 168, 170 will determine the final serpentine path of the film. For thicker films, the depth of engagement will be less than that required for thinner films, to provide the desired lateral column strength. For stiffer films, the depth of engagement will decrease. For a film of given thickness and stiffness, an increase in transverse width of the film will require a deeper engagement. Sensor 244 is used to signal the controller of the apparatus when carriage frame 84 and support plate 70 have reached the proper position for a given film format.

FIGS. 9 and 14 show features of a pair of optical code reader heads 274, 276 used to read optical codes on the film as it moves over curved central portion 162. Reader heads are provided for both edges of the film in the illustrated embodiment; however, a single reader head one only one carriage member may be used when the optical codes will appear on only one edge of the film. Each of carrier members 138, 140 includes a pair of parallel guide tracks 278, 280 which act as a frame to support transverse slider flanges 282 of a housing or body 284 of the reader head. Only one of flanges 282 is visible in FIG. 9. As seen in FIG. 14, body 284 includes a horizontal slot 286 through which an edge portion of a film strip passes during use of the apparatus. A vertical bore in body 284 receives a light emitting diode 290 whose beam is projected upwardly through a plano-convex lens 292 and through vertically extended opening 293 provided in central portion 162 of each edge guide. On the opposite side of slot 286, a code reader chip 294, of the type described in U.S. Pat. No. 5,317,139, is mounted on a carrier 296 behind a glass window 298. Preferably, window 298 is coated with a conventional infrared filter material to filter out the infrared range and reduce noise in the output of the reader chip. A cover plate 300 protects the chip from damage. As seen in FIGS. 4 and 9, a pair of keeper plates 312 hold each reader head in position on guide tracks 278, 280. As a film strip moves through the apparatus, light from diode 290 is projected through the transparent edge of the processed film, thus enabling reader chip 294 to detect and interpret the bar codes and provide the resultant information to the controller of the apparatus.

A mechanism is provided to precisely position each reader head relative to wall segment 152 of its associated edge guide. A shaft 302 is rotatably captured within block 284. A threaded end 304 of shaft 302 is in threaded engagement with a frame member 306 attached to carriage member 140. Within the block, a fourteen tooth pinion gear 308 fixed on shaft 302 is engaged by a rotatable worm gear 310. Thus, by rotating the worm gear from outside block 284, pinion 308 will rotate shaft 302 and cause threaded end 304 to rotate into or out of frame member 306. Block 284 thus can be traversed back and forth on guide tracks 278, 280 to position reader chip 294 relative to a fixed reference provided by the vertical surface of wall segment 152. For example, if threaded end 304 has an 8–36 thread and worm gear 310 is a ¼–20 set screw, then one full rotation of the worm gear will cause 0.002 inch (0.051 mm) movement of the reader head along the guide tracks. Thus, even though the edge guides are movable in the manner previously described, each reader head can be accurately adjusted to ensure its alignment with wall segment 152, thus greatly simplifying the set up of the apparatus.

Referring to FIGS. 4, 5, 8, 9 and 15, the edge notch detector according to the invention can be understood. By "edge notch" is meant a cut out portion or opening near or at the edge of the film, such as notch 24 which opens through the edge of the film or perforation 22 which opens inside the edge. The detector of the invention can be positioned to detect either type. Formed integrally with each carriage member 138, 140 are support blocks 314, 316 for a notch or opening detector. Each support block includes a worm gear 318 coupled to a pinion, not illustrated, and a threaded shaft 320, to provide an adjustment mechanism of the type described in the preceding paragraph. A pair of apertures 319 in support plate 70 permit rotation of worm gears 318 without raising the support plate. Shaft 320 is in threaded engagement with an upwardly extended tab 322 on a sensor support block 324. A guide pin or track 325, visible in FIG. 15, is captured in support block 324 and extends into a bore, not illustrated, in the associated support block 314, to constrain block 324 to horizontal movement. A slot or guide track 327 on an under side of edge guide 156 or 158, visible in FIG. 8, further constrains movement of block 324. A downwardly extended, L-shaped hanger bracket 326 is mounted to one side of block 324 to support an incandescent, coaxial optical fiber sensor 328 having an upwardly extended optical fiber probe 330. An essentially vertical bore through block 324 receives probe 330 which extends into a slot 334 formed in contact surface 160 at the top of curved portion 172, as best seen in FIG. 8. Because detectors are provided for both edge guides 156, 158, the apparatus can detect notches on both sides of the web. An electrical connector 336 provides notch detection signals to a controller 338 which may be mounted to an under side of deck plate 62, as indicated schematically in FIG. 3.

In operation of the notch or opening detector, a moving web of photographic film moves past slot 334. Unless a perforation 22 or notch 24 is present above slot 334, reflection occurs from an underside of the film, causing sensor 328 to produce a signal indicating no notch present. But, when a notch or opening appears above slot 334, no reflection or greatly reduced reflection causes the sensor to signal presence of a notch or 25 opening. The output of sensor 328 is directed to controller 338, which signals a downstream photographic printer when a notch is present, thus indicating that a downstream frame of the film is in position for scanning and projection onto photographic paper in the familiar manner.

Controller 338 is shown only schematically since those skilled in the art are familiar with the structure and function of such devices. In a most general sense, the controller energizes motor 216 to cause carriage 84 to move upward and slide 186 to move downward to engage rollers 262, 264 with the film. Eventually, the controller receives a signal from sensor 244 to indicate that the desired depth of engagement has been reached for the particular film. The Controller then energizes motor 108 to cause edge guides 156, 158 to move toward each other to engage a film strip and, eventually, receives a signal from sensor 179 to indicate that the desired spacing has been reached. The controller then causes motor 108 to rotate an additional amount to cause the resilient loading previously described. A signal indicating the width and physical properties of the film being transported through the apparatus is provided from one of readers 274, 276, depending on such edge of the film bears the bar codes. As previously indicated, the width and physical properties of the film will indicate the desired spacing of the edge guides and the depth of engagement of the serpentine path. When a different type of is to be run, the controller energizes the motors to separate the edge guides and disengage the rollers until the new film has been inserted.

Parts List 10 film flattening apparatus
12 photographic film strip
14 thin web 16, 18 edges of 12
20 frames
22 perforations
24 spaced notches
26 base
28 flat surface
30, 32 cylindrical portion
34, 36 curved contact surface of 30, 32
38, 40 film deflector member
42, 44 curved contact surface of 38, 40
46, 48 reliefs in 42, 44
50, 52 cylindrical elements
60 film code
62 support or deck plate
64, 66 apertures for fasteners
68 shallow image relief slot
68a image relief slot on 70
70 film deflector support plate
74 frame
76, 78 vertical slide surfaces on 74
80, 82 flanges on 84
84 cantilevered carriage frame
86, 88 keeper plates
90, 92 guide rollers on 80, 82
94, 96 slots in 74
98 back wall of 74
100, 102 cantilever arms
104 front wall
106 motor
108 output shaft
110 driver gear
112, 114 bearings
116 lead screw
118, 120 traveling nuts
122, 124 springs
126, 128 sliding collars
130 driven gear engages 110
132, 134 parallel guide tracks
136 open slot between 132, 134
138, 140 carriage members
142 holder or pocket in 138, 140
144, 146 lateral flanges to engage 132, 134
145, 147 keepers
148 vertical edge guide member
150, 152, 154 wall segments
156, 158 horizontal edge guide members
160 undulating, horizontal contact surface
162 central curved portion
164, 166 further, downwardly curved portions
168, 170 valley portions
172, 174 upwardly curved portions
176 sloping wall of 156, 158
178 fasteners
179 sensor
179m magnet on 145, 147
180 slide support plate
181, 183 shaft
182, 184 pivot blocks
185 fasteners
186 vertical slide for 70
188, 190 guide rollers
192, 194 slots in 180
196, 198 guide tracks
200, 202 fasteners for 196, 198
204, 206 elevator levers
208 dual cam plate
209 axle
210 cam slot
212 axle for 214
214 cam follower
216 motor
218 output shaft
220 gear
222 gear
224 gear
226 gear on 208
228 slot in 204
230 rotary connector
232 slot in 74
234 slot in 206
236 rotary connector
238 slot in 180
240 disk
242 magnetic inserts
244 sensors
246 spring
248 mounting bracket on 186
250 axle
252 springs
253 external knob
254, 256 stops
258, 260 downward bosses on 70
262, 264 rollers
266, 268 axles
270, 272 raised edges of 262, 264
274, 276 optical code reader heads
278, 280 guide tracks on 138, 140
282 transverse slider flanges on 284
284 housing or body of 274, 276
286 slot for edge of 12
288 bore
290 light emitting diode
292 plano-convex lens
293 opening in 162
294 reader chip
296 carrier
298 window
300 cover
302 shaft
304 threaded end of 304
306 frame member attached to 140
308 pinion
310 worm gear
312 keepers
314, 316 support block for notch or opening detector
318 worm gear
319 apertures in 70
320 shaft
322 tab
324 sensor support block
325 guide pin or track
326 L-shaped hanger bracket
327 slot or guide track on under side of 156, 158
328 incandescent coaxial optical fiber sensor
330 optical fiber probe
332 bore through 324
334 slot in 160 at 172
336 electrical connector
338 controller While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for detecting an edge opening in a web of photographic film, comprising:
   first frame;
   an edge guide supported by said first frame, said edge guide comprising a surface for engaging an edge of the web moving past said edge guide; an aperture in said surface;
   a guide track supported by said first frame and extended transverse to said edge guide;
   an optical sensor mounted on said guide track, said sensor comprising a probe extended through said aperture to a point near said surface to detect an edge notch; and
   means for moving said sensor along said guide track to position said probe for accurate detection.

2. Apparatus according to claim 1, wherein said means for moving comprises:
   a housing supported by said first frame;
   a shaft mounted for rotation in said housing, said shaft having an end in threaded engagement with said sensor.
   a pinion fixedly mounted on said shaft; and
   a worm gear mounted for rotation in said housing and engaged with said pinion, whereby rotation of said worm gear causes said pinion to rotate said shaft and said end to move said sensor along said guide track.

3. Apparatus according to claim 1, further comprising:
   a second frame;
   a substantially straight track supported by said second frame;
   a carriage member mounted for movement along said track, said first frame being supported by said carriage member,
   said edge guide being supported by said carriage member, said edge guide being positioned transversely to said track; and
   means for moving said carriage member back and forth along said track.

4. Apparatus according to claim 3, further comprising:
   a flexure resiliently engaging said means for moving said carriage member with said carriage member;
   wherein said means for moving said carriage member comprises:
   a lead screw rotatably supported by said frame;
   a traveling nut on said lead screw;
   said flexure resiliently engaging said nut with said carriage member when said guide is moved toward the web; and
   means for rotating said lead screw.

* * * * *